INVENTORS
DONALD M. PATTERSON
ROBERT L. DAVIS
ROBERT F. PFOST

Robert G. Clay
ATTORNEY

INVENTORS
DONALD M. PATTERSON
ROBERT L. DAVIS
ROBERT F. PFOST

Robert G. Clay
ATTORNEY

INVENTORS
DONALD M. PATTERSON
ROBERT L. DAVIS
ROBERT F. PFOST
Robert S. Cloy
ATTORNEY 3,361,878
SIGNAL SWITCHING SYSTEM UTILIZING MAGNETIC SWITCHING FOR ROTATING HEAD RECORDERS Donald M. Patterson, Sunnyvale, Robert L. Davis, Redwood City, and Robert F. Pfost, Mountain View, Calif., assignors to Ampex Corporation, Redwood City, Calif., a corporation of California Filed Mar. 11, 1964, Ser. No. 351,012
13 Claims. (Cl. 179—100.2)

ABSTRACT OF THE DISCLOSURE

The magnetic recording heads carried on the drum for rotation past the recording medium are each inductively coupled to the signal source through a saturable magnetic core which is disposed in a gap between opposing pole pieces of a magnetic member capable of providing saturating flux for the core. The magnetic saturating flux through the core is maintained to effectively decouple the recording head from the signal source when the head is outside of the active recording region adjacent the recording medium. When the recording head is in the active region, the saturating flux through the core is interrupted, either by a fixed magnetic shunt member disposed to bypass the flux around the core or by stopping the flow of power to an electromagnet producing the flux.

This invention relates to rotating magnetic head transducers, and more particularly to switching means for selectively coupling and decoupling the rotating magnetic heads of a transverse or helical track magnetic tape assembly to associated circuitry.

Rotating magnetic head assemblies, particularly those used in wideband tape recorders for instrumentation and television signals, commonly employ a rotating element with a plurality of equally spaced peripheral heads or transducers. In one system, the magnetic tape is advanced longitudinally in the direction of the axis of a drum having four heads while the tape is curved by an appropriate tape guide to conform to the curvature of the drum periphery. In a similar system, the tape is held flat and advanced longitudinally in a direction normal to the drum axis so that the heads move in an arc across the tape. With these systems each head sequentially sweeps a separate track across the width of the tape to record or reproduce a given signal. In another type system, the tape is helically wrapped about a stationary drum within which, for example, a pair of diagonally opposed transducers are rotated. The tracks recorded with this system are thus slanted at a much greater angle to the transverse direction on the tape.

During the recording process, the signal to be recorded may be transmitted concurrently to all of the rotating heads so that the signal is recorded by whichever head is in contact with the tape. The tape, however, usually extends over a transverse arc greater than the angular spacing between the heads on the periphery of the rotating drum. Consequently, two heads may at the same time be in contact with opposite edges of the tape. This occurs during the short interval when one head is just coming onto one edge of the tape before the preceding head has left the other edge. Thus a portion of the signal would be recorded in duplicate at the opposite edges of the tape in two separate transverse tracks.

Whereas this partial duplication of the recorded signal may be useful for some purposes during recording, reproducing such a signal creates certain problems. First of all, the heads not in contact with the tape at any given moment can generate stray noise as a result of unpredictable magnetic fields in the immediate area; consequently, the heads should be disconnected from the reproducing circuitry except when they are actually reproducing the recorded signals. Secondly, if a head is already in a reproducing mode when it begins a sweep of the tape, an undesirable transient signal is generated as the head first comes into contact with the tape. Accordingly, this transient signal must be eliminated by special means in the playback circuitry.

Various devices have heretofore been employed for solving these problems. In one such device, each of four rotating heads is coupled by a separate slip ring through a four-way electronic switch to the associated reproducing circuit. As each head reaches a selected starting point for a track, it connects through the four-way switch to the reproducing circuitry. As the head reaches another selected point close to the end of the track, it is disconnected while the next head is simultaneously connected. Much the same result is achieved by another device wherein each head is coupled to a separate segment of a four segment commutator. The commutator has a brush arrangement for engaging each segment only during the sweep of its associated head across the tape, thereby coupling that head to the reproducing circuitry.

However, the electronic and mechanical switches employed in these prior systems are not entirely satisfactory. Purely electronic switching devices tend to introduce undesirable switching transients that require additional circuitry for eliminating them from the signal. In addition, considerable circuitry is needed to accomplish switching at precisely the right times. Mechanical switching devices, such as those employing commutators, have a finite life due to mechanical wear and electrical sparking damage, and also generate undersirable noises and are inherently slower in operation.

Therefore, it is an object of the present invention to provide an improved switching device for use with rotating magnetic head assemblies for recording and reproducing information on a magnetic medium.

Another object of the present invention is to provide an improved rotating magnetic head switching arrangement, A further object of the present invention is to provide a magnetic head switching system for use with transverse track recording and reproducing systems wherein switching between the magnetic heads may be accomplished without introducing undesirable switching transients into the signal.

Yet another object of the invention is to provide a more durable magnetic head switching circuit without mechanical contact switches and electronic switching circuits.

Yet a further object of the invention is to provide an improved electronic head switching arrangement which does not produce undesirable switching transients in the transmitted signal.

Still another object of the invention is to provide an improved switching arrangement for rotating magnetic heads utilizing commutator segments, whereby no switching transients are introduced in the signal by the switching operation.

A switching apparatus in accordance with the present invention provides a separate saturable transformer coupling between record and reproduce circuits and each of the different rotating heads in a wideband magnetic recorder. Variable magnetic circuits dependent upon head position are established to define the switching points and control switching action.

More specifically, each separate transformer coupling may have primary and secondary windings wound upon a saturable core. One of the windings on each core is connected in series with the corresponding windings on the other cores and with the associated circuits. The remaining winding on each core is coupled to the associated recording and reproducing head assembly carried by the rotating drum. The different transformers each include a magnetic device for maintaining the saturable core in a saturated condition until its associated head has rotated into contact with the tape at the position where transverse recording or reproducing is to begin. With the core of the transformer saturated, the secondary winding is effectively decoupled from the primary winding of the transformer and remains uncoupled until such time as the saturating flux is removed.

The application and removal of the saturating flux from the transformers is synchronized with the rotation of the drum containing the heads. As a preceding head leaves the active area of the tape, the saturating flux is applied to its associated transformer, while at the same time the saturating flux is removed from the transformer associated with the following head, so that the signal is effectively switched from one head to the next. In accordance with one particular aspect of this invention, the saturating flux is applied to the transformer core in a direction perpendicular to the sensitive direction of the primary and secondary windings of the transformer. In this manner, a relatively large amount of saturating flux may be applied to completely saturate the core thus decoupling the primary and secondary windings without generating a switching transient in either the primary and secondary windings during its application or removal.

In a preferred embodiment of the invention, a permanent magnet arrangement is used to supply the saturating flux for eash of the transformer cores. The permanent magnet arrangement has pole pieces which provide pole tips of opposite magnetic polarity on either side of the transformer core. Both the primary and secondary windings on the transformer core are wound around the longitudinal axis of the core, and the longitudinal axis is disposed perpendicular to the flux lines between the pole tips of the permanent magnet. A clearance between the ends of the pole tips and the body of the transformer permits a magnetic shunting member having a U-shaped cross section to bypass the saturating flux. The heads, with their associated transformers, are mounted upon the rotating magnetic drum while the magnetic shunting member is held stationary relative to the tape. For a transverse track recorder, the magnetic shunting member forms an arc of a circle with an angle equal to the desired active track length on the curved tape, as for example 90° with a drum having four heads. Thus, while each of the magnetic heads is in the active tape area, its associated transformer is rotated with it into the U-shaped cross section of the magnetic shunting member, thereby removing the saturating flux from the transformer core.

In another preferred form of the invention, the saturating flux may be applied to the transformer cores associated with the rotating heads by controlling the application of current to an electromagnet arrangement for producing the necessary saturating flux. In this case, a separate electromagnet with magnetizing windings thereon is used for each magnetic head on the rotating drum. The current is applied in selective fashion, in accordance with the positions of the head relative to the tape, to apply and remove the saturating flux from the cores of the transformer. In one case, the current supplied to the windings on the electromagnet may be applied through appropriately positioned conductive segments rotating with the head assembly so that each of the heads is decoupled by the saturating flux when not within the active tape area. Alternatively, the rotation of the drum may be monitored by an appropriate device, such as a photoelectric cell, to produce signals for electronically switching the current to the different electromagnets at the correct times.

A better understanding of the invention may be had by reference to the detailed description taken in conjunction with the accompanying drawings, in which.

Figure 1:
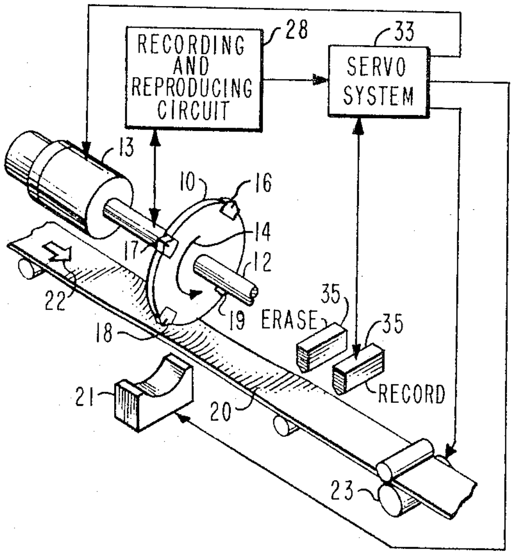
FIG. 1 is a simplified schematic illustrating the principal elements of a transverse track recording and reproducing magnetic tape system, which may employ the switching arrangement of the present invention.
Figures 2, 3:
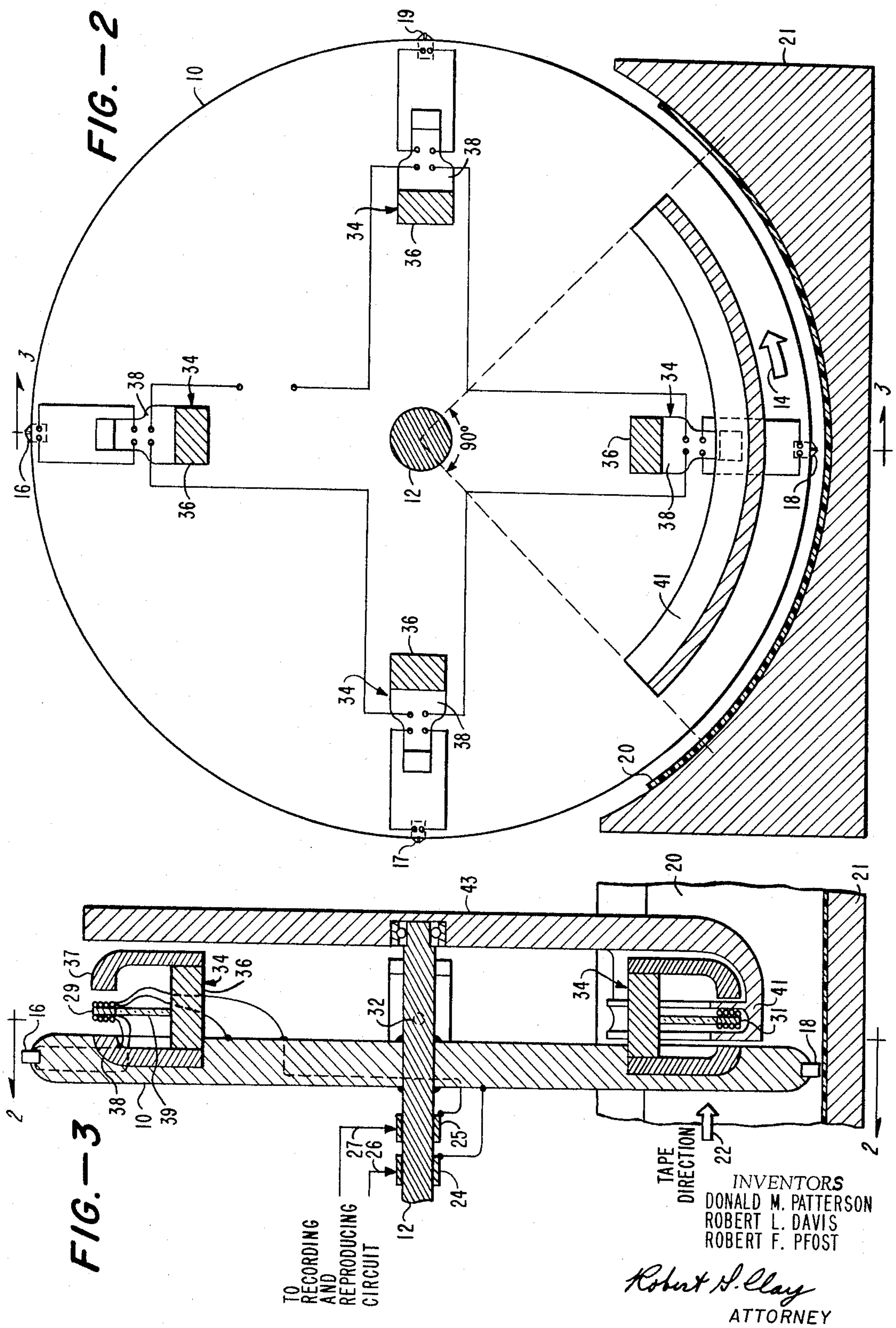
FIG. 2 is a detailed end view of a switching arrangement in accordance with the invention taken in section along the line 2—2 of FIG. 3.
FIG. 3 is a side-sectional view of the head switching arrangement in accordance with the invention taken along the line 3—3 of FIG. 2.

Referring now generally to FIG. 1 and more particularly to FIGS. 2 and 3, a rotating drum 10 is mounted on a shaft 12 for rotation by a drum motor 13 in a counterclockwise direction as illustrated by the arrow 14. On the circumference of the drum 10 are mounted four magnetic recording and reproducing heads 16, 17, 18, and 19. The magnetic tape 20 is curved transversely around the circumference of the drum 10 by an engaging female tape guide 21 so that each head traverses the entire width of the tape during rotation. The tape 20 is also moved lengthwise, as indicated by the directional arrow 22 in FIGS. 1 and 3, by the action of a capstan 23 with an associated pinch roller. Thus each head sweeps a separate transverse track in crossing the tape. This much of the head drum and the associated system may be conventional, and accordingly a detailed description of the tape handling system and its associated circuitry has been omitted for simplicity.

On the shaft 12 are mounted two 360-degree slip rings 24 and 25, which are engaged during rotation by the brushes 26 and 27, respectively, so as to connect external recording and reproducing circuits 28 to the circuitry within the rotating head 10. The rotational speed of the drum 20 and the longitudinal tape speed are closely controlled by a servo system 33 in the well known manner. Timing signals derived from the signal or from a separate control track are compared with a stable reference frequency. If desired, the additional head structures 35 may be provided for erasing strips along either or both edges of the tape to permit audio or control signals to be recorded on the clean strips. If head switching is not to occur during the record mode, both slip rings would still be employed, but the magnetic switching system in accordance with the invention would be used only during reproduction.

Each of the rotating heads 16, 17, 18 and 19 is coupled through an associated saturable core transformer 29, 30, 31 and 32 to the record and reproduce circuits via the slip rings 24 and 25 and the associated brushes 26 and 27. Each of the saturable core transformers 29–32 contains two windings, which will hereinafter be referred to as the primary and secondary windings in accordance with the recording mode of operation of the system. It should, however, be understood that in the reproducing mode of operation the normal meanings of the terms "primary" and "secondary" windings is reversed. The primary windings of the transformers 29–32 are all connected in series with one another and with the recording and reproducing circuits. The secondary windings, on the other hand, are each individually connected to a respective one of the heads 16–19. In conventional fashion, the primary and secondary windings are inductively coupled to transmit a signal by virtue of flux changes occurring in the core.

Also associated with each of the saturable core transformers 29–32 is a permanent magnet assembly 34 which is mounted on and rotates with the drum 10. The permanent magnet assembly 34 may comprise a three-element assembly consisting of a permanent bar magnet 36 with a pair of opposing magnetic pole pieces 37 and 38 permanently joined at the ends of the bar magnet 36. The associated transformers 29–32 are held by a non-magnetic mounting member 39 which is joined to and extends outwardly from the center of the bar magnet 36 to hold each transformer between the opposing pole pieces 37 and 38. The opposing pole pieces 37 and 38 are formed to provide pole tip faces opposite one another on either side of the associated transformer so that the core of the transformer lies directly in the path of the flux lines established between the pole tips. The pole pieces 37 and 38 may be tapered at their ends toward the pole tip to concentrate the flux provided by the bar magnet 36 to insure that sufficient flux density exists between the faces, so as to place the transformer core in a thoroughly saturated condition. It should be noted that the windings on the transformers 29–32 are wound about the longitudinal axis of the core and the longitudinal axis is disposed perpendicular to the direction of the saturating flux emanating from the pole tips. In this manner, the saturating flux is perpendicular to the sensitive direction of the windings of the transformers 29–32 so that no signal is generated in either the primary or secondary circuits of a transformer by the application or removal of the saturating flux.

A substantial clearance is provided between the transformer assemblies 29–32 and each of their associated pole tip faces to permit the insertion of an open-ended magnetic shunt element having straight-leg portions which extend into the clearance on either side. (See FIG. 3.) The saturating flux is bypassed to the closed end of the shunt element around the unattached end of the transformer core.

In accordance with the invention, a shunting member 41 having a U-shaped cross section is attached to or forms an integral part of a support member 43 which is maintained stationary with respect to the tape guide 22. The shunting member 41 is formed as a unitary structure of soft magnetic material, such as cast iron, having a constant radius with respect to the axis of rotation of the drum 10 and a constant U-shaped radial cross section. The shunting member 41 extends axially along an angular section which is equal to the angle described by desired active area on the curved tape 20 at the periphery of the drum 10. In the case of the four-head arrangement shown herein, the angle is 90 degrees. Therefore, as one of the heads 16–19 approaches the desired active area on the tape 20, the associated transformer 29–32 enters the U-shaped radial slot of the shunting member 41. By this means, the saturating flux from the magnetic assembly 34 is bypassed around the transformer core to permit inductive coupling of the primary and secondary windings so that signals can be transmitted between the recording and reproducing circuits and the associated head.

Preferably, as shown in the drawings of FIGS. 2 and 3, the transformers and associated magnetic members 34 are radially aligned with their associated magnetic heads on the drum 10. However, it should be obvious that the various transformers and magnetic members may be angularly displaced from alignment with their associated heads by a fixed amount, as long as the shunting member 41 is angularly displaced from the desired active area on the tape by the same fixed amount.

When a particular head 16–19 leaves the active area on the tape 20, the associated transformer 29–32 at the same time emerges from the U-shaped magnetic member 41, and the saturating flux is again applied to the transformer core to decouple the primary and secondary windings. The saturating flux sustains this decoupling action until the head again approaches the active area on the tape. Therefore, as the drum 10 rotates, each head is smoothly coupled and decoupled from the recording and reproducing circuits automatically, so that signals are transmitted only during the interval in which the head is in the active tape area.

Accordingly, the preferred form of the invention described in connection with FIGS. 1, 2 and 3 provides a switching arrangement for the rotating magnetic heads of a tape recording and reproducing system whereby the heads are selectively coupled to the recording and reproducing circuits only during the interval during which they are adjacent the desired active tape area. The switching between heads is accomplished without introducing switching transients into the signals and without the necessity of relying upon mechanical or electronic switching arrangements which have finite operating life or require timing control. Moreover, this switching arrangement permits the use of low cost conventional electrical circuit components instead of the more expensive and less reliable electronic circuit elements previously employed to achieve switching of the heads. Furthermore, there is none of the mechanical wear caused by frictional contact of the switching elements nor is there electrical wear caused by sparking between contact points as with some mechanical switching arrangements.

Figure 5:
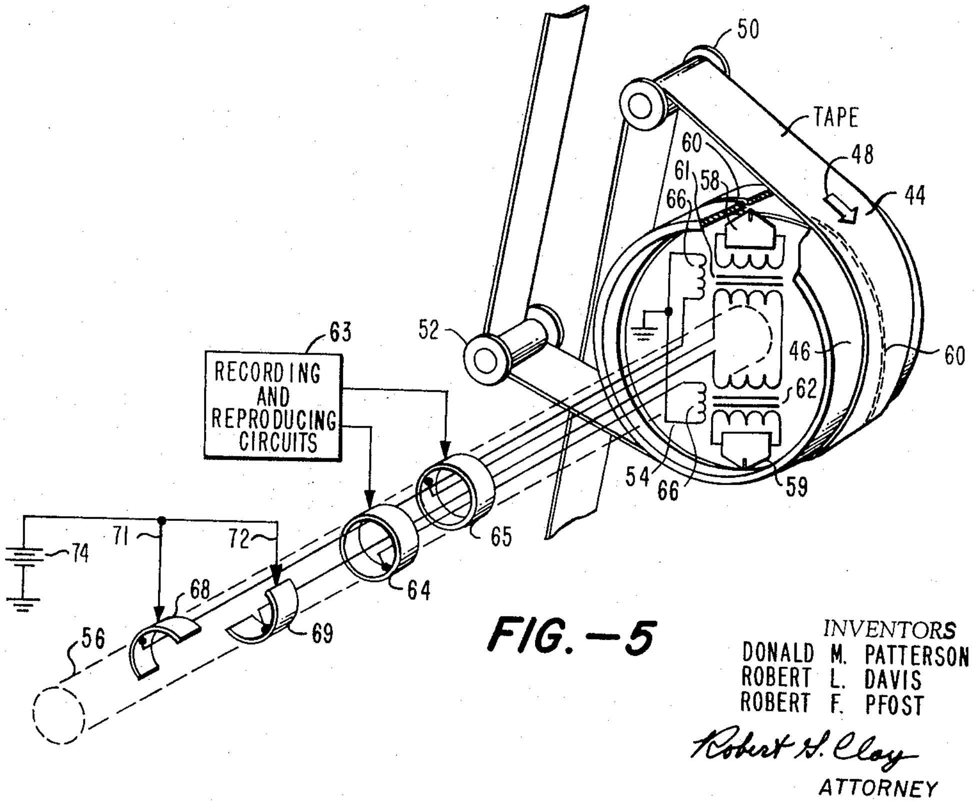
FIG. 5 is a simplified schematic of an alternative embodiment of a head switching arrangement in accordance with the invention wherein electromagnets are employed for selectively saturating the transformer cores.

A head switching arrangement in accordance with the invention is particularly useful in helical scan type tape recorders, as shown in FIG. 5. In this type of recorder, the tape 44 is wrapped about a tape cylinder in a helical path. In operation, the tape 44 moves longitudinally in the helical path about the outer surface of the cylinder 46 in the direction indicated by the arrow 48.

In the particular arrangement shown in FIG. 5, a pair of guide rollers 50 and 52 are disposed to provide a wrap angle around the cylinder in excess of 180° of the cylinder periphery. A head drum 54 is mounted on a shaft 56 for rotation in a selected direction within the outer cylinder 46, and in this instance, carries a pair of magnetic heads 58 and 59 mounted on its circumference. The cylinder 46 is provided with a centrally located circumferential slot 60, within which the heads 58 and 59 rotate to sweep across the tape surface. The longitudinal movement of the tape causes the heads to sweep in separate parallel tracks across the tape while recording or reproducing a signal.

Such helical scan recorders are presently being used in various applications instead of other types of transverse track recorders. The helical scan operation has the advantage of providing greater length to each separate track so that more information may be recorded during each sweep. This has proved particularly advantageous for recording television signals since an entire video frame can be accommodated by a single track. However, the acute angle of these tracks relative to the edges of the tape necessitates precise switching of the signal between the rotating recording heads. Accordingly, a head switching arrangement in accordance with the invention has particular utility in providing helical scan tape recorders.

The tape 44 moves lengthwise in the direction shown by the arrow 48 so that the heads 58 and 59 sweep separate transverse tracks each time they cross the tape. The heads 58 and 59 are each inductively coupled through a respective saturable core transformer 61 and 62 to the recording and reproducing circuits 63. The primary windings of the transformers 61 and 62 (following the previously established convention concerning reference to the primary and secondary windings as being in the recording mode) are connected in a series circuit with one another. The series circuit of primary windings is in turn connected by means of a pair of slip rings 64 and 65 mounted on the shaft 56 to the terminals of the recording and reproducing circuits 63.

Both of the saturable core transformers 61 and 62 may use an associated electromagnet 66 (as illustrated generally in FIG. 5 and in more detail in FIGS. 6 and 7) for applying a saturating flux to the core instead of the simpler preferred switching arrangement illustrated in FIGS. 2 and 3. The flux from the electromagnets 66 is applied in a direction perpendicular to the sensitive direction of the transformer windings. The electromagnets 66 are mounted for rotation with the head drum 54 and are individually connected through two 180-degree commutator segments 68 and 69. The two commutator segments 68 and 69 are mounted opposite one another on the shaft 56 to be engaged in alternating fashion by the corresponding brushes 71 and 72. The commutator segments 68 and 69 are aligned with respect to their corresponding brushes 71 and 72 so that, when head 58 is in the active tape area, the brush 72 contacts the segment 69, and, when the head 59 is in the active tape area, the brush 71 contacts the commutator segment 68. In this manner, current is delivered from a power source 74 to that one of the electromagnets 66 whose associated head 58 or 59 is not in contact with the active tape area. The core of the associated transformer 61 or 62, respectively, is thereby saturated to decouple the head from the recording and reproducing circuits 60. To summarize, as one of the heads 57 or 58 comes into the active tape area, its electromagnet 66 no longer receives current from the source 74 so that the saturating flux is removed from the respective transformer core, and the head is coupled to the recording and reproducing circuit 63.

Figure 6:
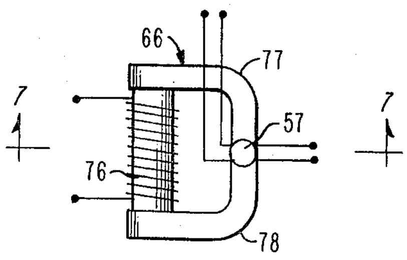
FIG. 6 is a detailed top view of the electromagnet and transformer core arrangement employed in the embodiment of FIG. 5.
Figure 7:
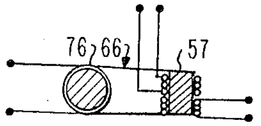
FIG. 7 is a side full-sectional view of the electromagnet and transformer arrangement taken along the line 7—7 of FIG. 6.

Referring now to FIGS. 6 and 7, the details of an electromagnet and transformer, such as may be used in the switching arrangement of FIG. 5, is shown in more detail. The electromagnet may consist of a core element 76 around which a magnetizing coil is wound. Two pole pieces 77 and 78 are joined at either end of the wound core element. Both the core element 76 and the pole pieces 77 and 78 are composed of a magnetic material with low remanence, such as pure cast iron, and may therefore be of unitary construction. The ends of the role pieces 77 and 78 are composed of a magnetic either side of the associated transformer 61. These pole tips may be shaped (as shown in FIG. 6) to closely fit the outside dimensions of the transformer 61 so that the flux produced in the electromagnet is concentrated as saturating flux in the transformer core. The axis of the transformer core is disposed perpendicular to the flux field between the pole tips. Thus, when current is applied to the windings of an electromagnet 66, the associated transformer core is saturated, and consequently the primary and secondary windings of the transformer 61 are decoupled.

This switching arrangement provides a commutating type of switching action to couple and decouple the heads 57 and 58 to the recording and reproducing circuits 63, while avoiding the introduction of the usual switching transients into the signal circuitry.

Figure 8:
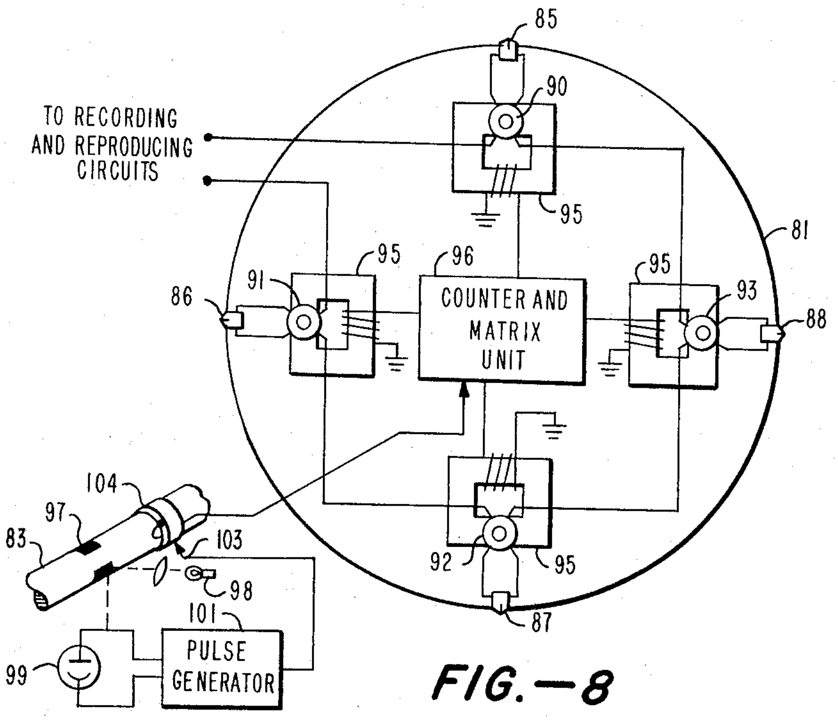
FIG. 8 is a simplified schematic and circuit diagram of an alternative form of head switching arrangement utilizing electromagnets.

Referring now to FIG. 8, there is shown a head switching arrangement in accordance with the invention wherein electronic switching may be employed. A drum 81 is mounted on a shaft 83 for rotation with four magnetic heads 85, 86, 87 and 88 which are carried at equal intervals around the circumference of the drum. Each of the heads 85–88 has a respective transformer 90, 91, 92 and 93 inductively coupling the heads to the recording and reproducing circuits (not shown). The transformer cores may be toroidal in shape and have been illustrated herein with the primary and secondary windings disposed on opposite sides of the toroid. An electromagnet 95 is associated with each of the transformers 90–93 and has an actuating winding wound about one portion. The opposite magnetic polarity pole tips are arranged on either side of the toroidal transformer core so that, when a current is applied to the winding, the electromagnet 95 provides saturating flux to decouple the primary and secondary windings.

Current producing the saturating flux for the electromagnets 95 is obtained from a counter and matrix unit 96 which permits only the head in the active tape area to be coupled to its transformer to the recording and reproducing circuits. The counter and matrix unit 96 is synchronized with the rotation of the drum 81 by means of an optical commutating ring 97 consisting of alternating, equally spaced reflecting and non-reflecting segments. Light obtained from a source 98 is focused on the optical commutating band 97 to be reflected therefrom toward a photoelectric cell 99. The photoelectric cell 99 is in turn coupled to a conventional pulse generator 101 which responds to each change in the condition of the photoelectric cell 99 to generate a separate pulse. These pulses are then applied through a brush 103 and a slip ring 104 mounted upon the rotating shaft 83 to the input of the counter in the counter and matrix unit 97.

Figures 4, 9:
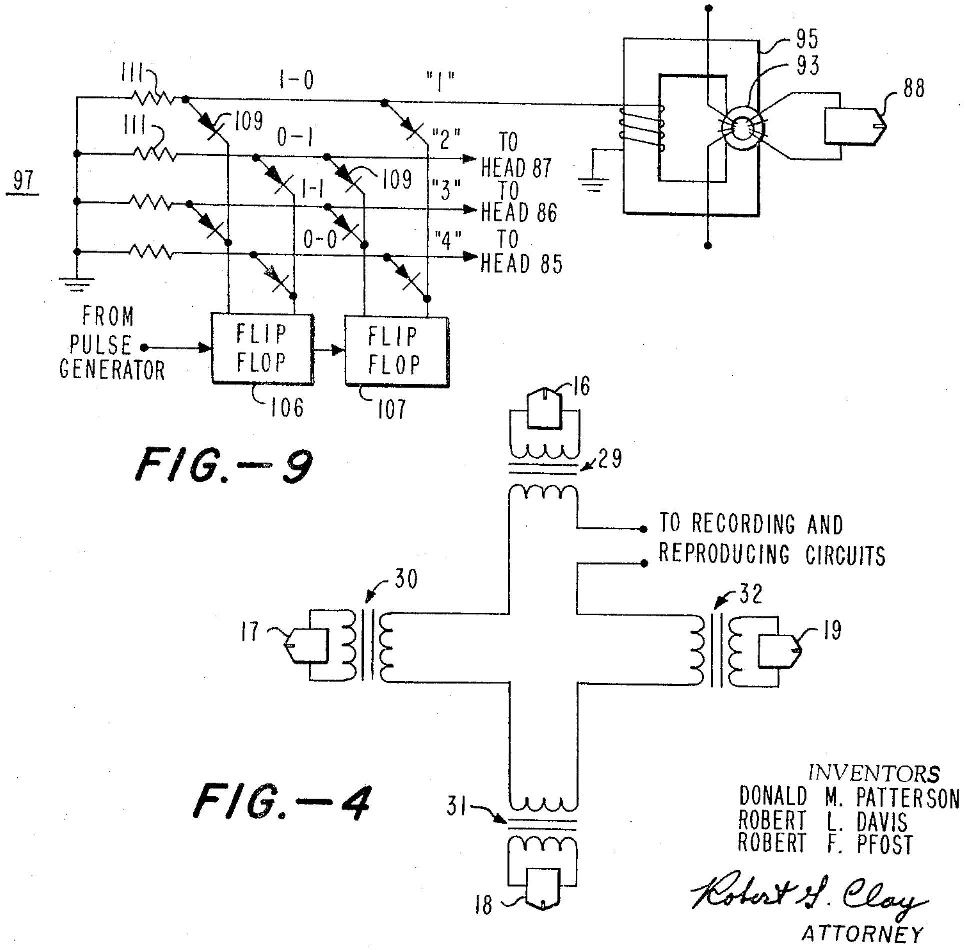
FIG. 4 is a simplified circuit diagram showing the transformer connections employed in the switching arrangement illustrated in FIGS. 2 and 3.
FIG. 9 is a detailed circuit diagram of a counter and matrix unit that may be employed in the head switching arrangement of FIG. 8.

As shown in more detail in FIG. 9, the counter and matrix unit 97 may consist of a two-stage binary counter having a pair of bistable flip-flop circuits 106 and 107 interconnected in typical binary counter fashion to provide a count total of four. Pulses from the pulse generator 101 are applied to the first stage in the binary counter 106 to advance the binary count by one count for each pulse received. For purposes of this explanation, it will be assumed that a negative potential is applied to the left-hand output of each of the flip-flops 106 and 107 when the flip-flop is in the "zero" state, and to the right-hand output when in the "one" state. Each of the output terminals from the counter flip-flops 106 and 107 is selectively connected through diodes 109 to two of four output lines designated "1," "2," "3" and "4" to form a diode matrix. Each of the output lines "1" through "4" is connected through a resistor 111 to ground potential while the other end of the output line is connected to the winding of an appropriate electromagnet 95.

The connection of the counter stages 106 and 107 with the diode matrix causes a negative signal to be applied to each of the output lines except the one used to designate the number contained at that instant in the counter. For example, when the counter flip-flop stages 106 and 107 contain the binary count 1–0, a negative potential is applied through diodes 109 to the output lines "2," "3," and "4," while the output line "1" is the only one at ground potential. In that case, no current flows through the coil on the electromagnet 95 associated with the transformer 93 and the head 88. Therefore, the head 88 is coupled to the recording and reproducing circuit.

Subsequently, when the head 88 reaches the end of the active area on the tape, the photoelectric cell 99 senses the change from a non-reflective portion to a reflective portion on the optical commutating ring 97 to generate a pulse to be applied to the first stage 106 of the counter. The counter stages 106 and 107 immediately reverse their former states and now register the binary number 0–1. This causes a negative signal to be applied to the "1" output line, while the "2" output line is returned to ground potential. Now the head 87 is coupled to the recording and reproducing circuit. Similarly, each head 85–88 is coupled in its turn to the recording and reproducing circuits as the count advances.

The primary and secondary winding of the transformers 90–93 have for convenience of illustration only been shown wound upon the toroidal cores in a manner that allows the saturating flux to pass along the sensitive axis of the winding. In practice, the toroidal cores are wound in conventional fashion with the primary and secondary windings being distributed uniformly around the entire circumference of the toroidal core. Accordingly, the effects of applying or removing the saturating flux are conceled out in the windings. This permits the switching between the heads to be accomplished with the precision and switching speeds available with electronic circuitry, without introducing switching transients into the signal path.

While there have been described herein and illustrated in the drawings various forms of head switching arrangements for use in transverse track recording systems in accordance with the invention it will be appreciated that many other modifications, variations and alternative forms are possible. Accordingly, the invention should be considered to include exemplifications falling within the terms of the appended claims.

What is claimed is:

1. A head switching arrangement for use in recording or reproducing a signal in a track on a selected active area of a magnetic recording medium comprising a plurality of magnetic heads mounted for rotation by a drum, a signal circuit, a plurality of saturable core transformer means, each of said transformer means inductively coupling a respective one of said heads to said signal circuit and being mounted for rotation with the respective one of said heads, a plurality of magnetic means for applying a saturating flux to associated ones of the transformer cores for uncoupling said heads from said signal circuit, and means responsive to the rotational position of the heads relative to the recording medium for selectively interrupting the application of the saturating flux to each transformer core when the respective head is adjacent the desired active area.

2. In a magnetic recording and reproducing system having a plurality of rotating magnetic heads, a signal switching arrangement comprising a signal circuit, a plurality of saturable core transformer means for inductively coupling respective ones of said heads to said signal circuit, said transformer means having primary and a secondary windings wound upon the core so as to produce no signal in response to a flux change in a given direction applied to saturate said core, magnetic means for applying a saturating flux in said given direction to each of the transformer cores to uncouple said heads from said signal circuit, and means for selectively interrupting the application of the saturating flux to each of the transformer cores when the respective head is adjacent a particular area of the magnetic recording medium.

3. A head switching arrangement for switching a signal between successive rotating transducers over a selected active angle of each rotation comprising a saturable core transformer means and a magnetic means associated with each of said transducers and mounted for rotation therewith, said saturable core transformer means having primary and secondary windings to provide inductive coupling to each of said transducers, said magnetic means providing pole tips of opposite magnetic polarity on either side of the respective transformer core for applying a saturating flux thereto, and a magnetic shunting member for providing a low reluctance magnetic path between the pole tips to bypass the saturating flux around the associated transformer core, said magnetic shunting member being radially disposed over the selected active angle of rotation whereby the saturating flux is removed from a transformer core while the respective head is in said active angle area to permit inductive coupling between the primary and secondary windings.

4. The head switching arrangement of claim 3 wherein said magnetic shunting member has a U-shaped radial cross section to cover the transformer means so that the straight portions of the U-shape are positioned between the pole tips of the magnetic member while the respective head is in the active tape area to shield the transformer core from the saturating flux.

5. A system for successively switching signals between a number of magnetic heads on a rotating member and associated circuitry comprising: a rotating member having at least two magnetic heads spaced thereabout, magnetic means providing a principal portion of a magnetic path in fixed relation to the rotating member, said magnetic means having end portions defining points at which switching is to take place; transformer means coupling the magnetic heads to the associated circuitry; and means coupled to the transformer means and disposed adjacent the magnetic means and mounted to be rotated with the rotating means for saturating the transformers under the control of the magnetic means to decouple the magnetic heads from the associated circuitry.

6. A magnetically controlled switching system comprising a movable member forming part of a magnetic path; a fixed member passing within said movable member to complete the magnetic path; and a magnetic coupling circuit attached to said movable member and controlled by the flux in the path, said magnetic coupling circuit being saturated by the flux from said movable member whenever said fixed member is not within said movable member.

7. A system for successively switching signals between a number of magnetic heads on a rotating member and the associated signal circuitry comprising transformer means for individually coupling each of the magnetic heads to the associated signal circuitry, said transformer means having a saturable core, magnetic means disposed adjacent the transformer means for providing a saturating flux to the saturable core of each transformer means, said magnetic means and said transformer means being mounted for rotation with their respective magnetic heads, and shunting means defining a magnetic path for the saturating flux to bypass the saturable core, said magnetic shunting means having end portions defining points at which magnetic switching is to take place and forming a continuous magnetic shunt over a fixed rotational arc of the rotating member.

8. A control switching system for switching signals from a signal circuit between a plurality of magnetic heads on a rotating member comprising a fixed member defining a portion of a low reluctance magnetic path, a movable member defining the remainder of separating magnetic paths mounted for rotation with the respective heads, and a saturable transformer means for coupling each of the heads to said signal circuit, said saturable core transformer means being disposed between the end portions of the magnetic paths defined by the movable member to receive saturating flux, said fixed member being formed to bypass the magnetic flux from the core during a portion of the rotation of said movable member.

9. A system for successively switching electrical signals between a pair of magnetic heads on a rotating member and the associated signal circuitry comprising: a pair of transformer means for individually coupling the magnetic heads to the associated signal circuitry, said transformer means having a saturable magnetic core; a pair of magnetic means disposed adjacent both transformer means for providing a saturating flux to the saturable cores, said magnetic means and said transformer means being mounted for rotation on the rotating member with their respective magnetic heads; and a stationary shunting means defining a magnetic path for the saturating flux to bypass the saturable core, said magnetic shunting means having end portions defining points at which magnetic switching is to take place, said magnetic shunting means forming a magnetic shunt over a fixed rotational arc of the rotating member.

10. A system for successively switching signals between four magnetic heads on a rotating member and the associated signal circuitry comprising: four transformer means for individually coupling each of the four magnetic heads to the associated signal circuitry, said transformer means having a saturable core; magnetic means disposed adjacent each of the four transformer means for providing a saturating flux to the saturable cores, said magnetic means and said transformer means being mounted for rotation with their respective magnetic heads; and magnetic shunting means defining a magnetic path for the saturating flux to bypass the saturable cores, said magnetic shunting means having end portions defining points at which magnetic switching is to take place, said magnetic shunting means forming a continuous magnetic shunt over a fixed rotational arc of the rotating member.

11. A head switching arrangement for switching signals between successive rotating transducers and associated signal circuitry comprising: a saturable core transformer and a magnet associated with each of said transducers and mounted for rotation therewith, said saturable core transformers having primary and secondary windings to provide inductive coupling between said transducers and the associated signal circuitry, said magnet having pole tips of opposite polarity disposed on either side of the respective transformer core for applying a saturating flux thereto; and a magnetic shunting member for providing a low reluctance magnetic path between the pole tips of the magnet to bypass the saturating flux around the associated transformer core, said magnetic shunting member being radially disposed over a selected active angle of rotation, so that the saturating flux is removed from the transformer core while the respective head is in said selected active angle to permit inductive coupling between the primary and secondary windings.

12. The head switching arrangement of claim 11 wherein said magnet comprises a permanent magnet, and said primary and secondary windings are wound on the saturable core to sense flux changes occurring in a direction normal to the direction of the applied saturating flux from the pole tips of the permanent magnet.

13. A head switching arrangement for switching signals between successive rotating transducer over a selected active angle of each rotation comprising: a saturable core transformer means and an electromagnet means associated with each of said transducers and mounted for rotation therewith, said saturable core transformer means having primary and secondary windings to provide inductive coupling to each of said transducers, said electromagnet means providing pole tips of opposite magnetic polarity on either side of the respective transformer core for applying a saturating flux thereto when the electromagnet is energized; and electrical switching means responsive to the rotation for providing an electric signal to each of the electromagnets to saturate the associated magnetic core except when the associated transducer is in the selected active angle of rotation, whereby the saturating flux is removed by de-energizing the electromagnet when the respective head is in the selected active angle to permit inductive coupling between the primary and secondary windings.

References Cited

UNITED STATES PATENTS

| | | | |
|---|---|---|---|
| 1,302,284 | 4/1919 | Beall | 335—236 |
| 2,401,175 | 5/1946 | Morrill. | |
| 2,740,110 | 3/1956 | Trimble. | |
| 3,081,381 | 3/1963 | Merry | 179—100.2 |
| 3,152,226 | 10/1964 | Stratton | 179—100.2 |
| 3,170,031 | 2/1965 | Okamura | 179—100.2 X |
| 3,229,035 | 1/1966 | Bounsall | 179—100.2 X |

FOREIGN PATENTS

| | | |
|---|---|---|
| 865,168 | 4/1961 | Great Britain. |

BERNARD KONICK, *Primary Examiner.*

L. G. KURLAND, J. R. GOUDEAU, *Assistant Examiners.*